United States Patent [19]

Brown et al.

[11] 4,102,182
[45] Jul. 25, 1978

[54] QUALITY CHECKING SYSTEM FOR A THREADED FASTENER ASSEMBLY

[75] Inventors: Lowell R. Brown, Farmington Hills; Nathaniel L. Field, Northville, both of Mich.

[73] Assignee: Ford Motor Company, Dearborn, Mich.

[21] Appl. No.: 683,370

[22] Filed: May 5, 1976

[51] Int. Cl.² ............................................. G01L 3/02
[52] U.S. Cl. ..................................... 73/136 R; 73/137
[58] Field of Search ............... 73/88 F, 133 R, 136 R, 73/136 A–136 D, 137, 432 CR, 139; 81/52.4 R, 52.4 A, 52.4 B; 173/12

[56] References Cited

U.S. PATENT DOCUMENTS

| | | | |
|---|---|---|---|
| 3,440,869 | 4/1969 | Hardiman | 73/137 X |
| 3,643,501 | 2/1972 | Pauley | 73/88 F |
| 3,693,726 | 9/1972 | Hornig et al. | 73/88 F X |
| 3,962,910 | 6/1976 | Spyridakis et al. | 73/88 F |
| 3,965,778 | 6/1976 | Aspers et al. | 173/12 X |
| 3,973,434 | 8/1976 | Smith | 73/139 |
| 3,974,685 | 8/1976 | Walker | 73/88 F |
| 4,008,772 | 2/1977 | Boys | 73/136 A X |

*Primary Examiner*—Richard C. Queisser
*Assistant Examiner*—Charles Gorenstein
*Attorney, Agent, or Firm*—Donald J. Harrington; Keith L. Zerschling

[57] ABSTRACT

A method for measuring the relationship between the angle of rotation of a threaded fastener and the torque applied to the threaded fastener and for detecting variations in the rate of increase of torque with respect to the corresponding angular displacement of the fastener within predetermined torque limits, the first torque limit being the lowest threshold torque that is experienced as the threaded fastener is tightened, the next higher torque limit being a calibrated starting point torque intermediate the lower torque limits for the zone of the desired maximum torque values for the fastener and the threshold torque, the next two higher torque limits defining the torque zone representing the desired maximum torque to be applied to the fastener to assure a quality assembly.

3 Claims, 5 Drawing Figures

Good Part

Good Part

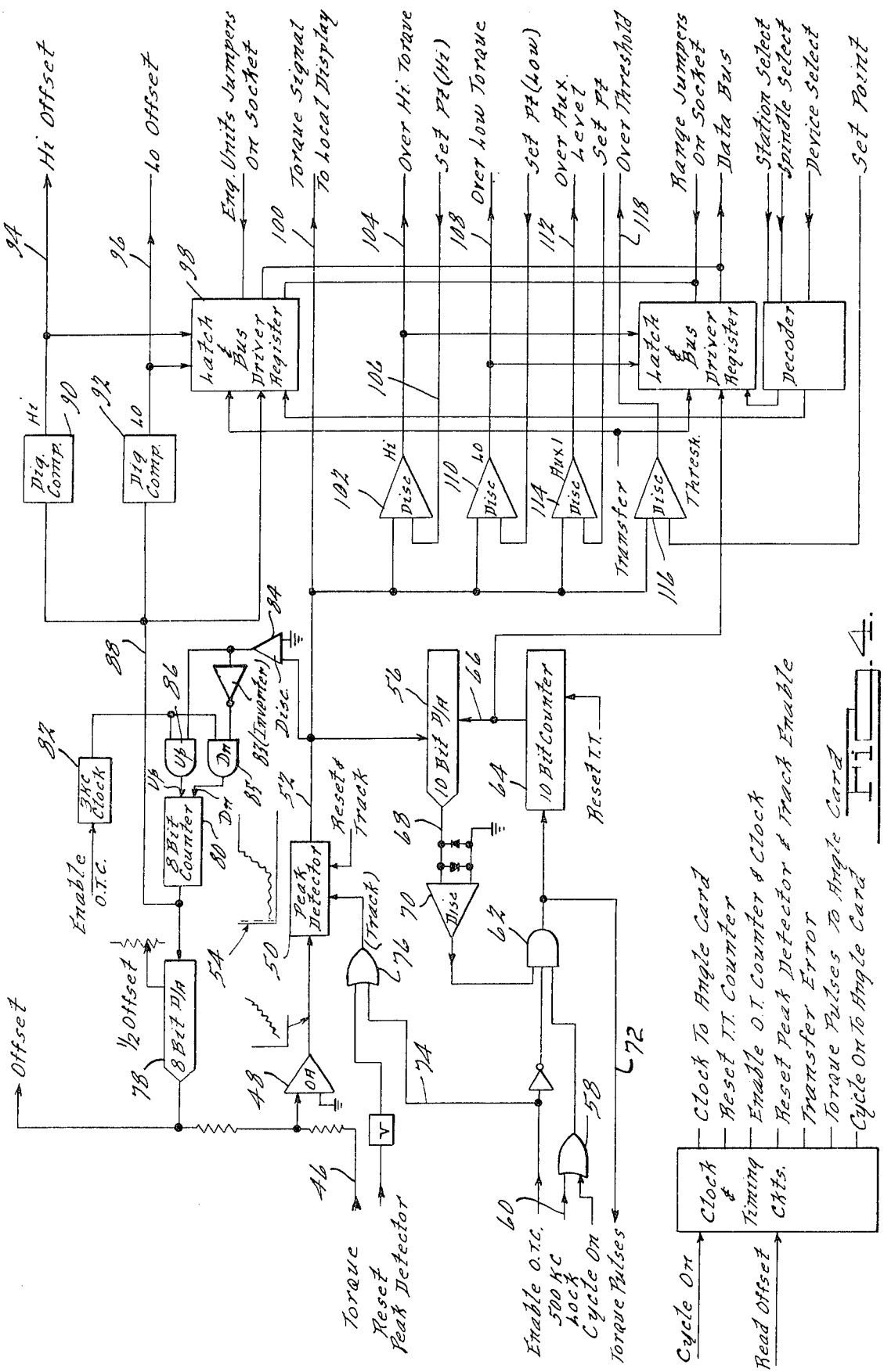

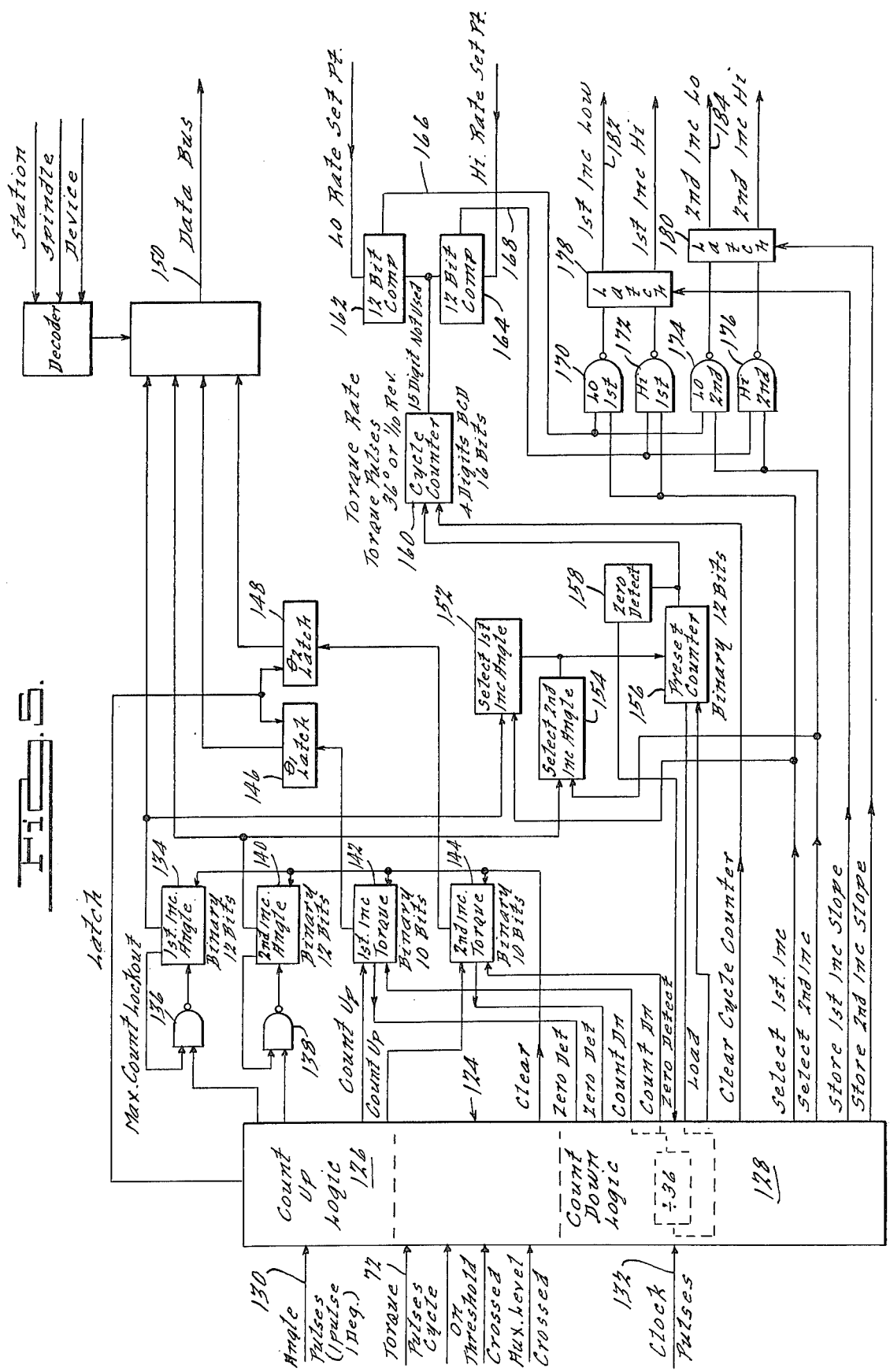

QUALITY CHECKING SYSTEM FOR A THREADED FASTENER ASSEMBLY

BRIEF DESCRIPTION OF THE INVENTION

Our invention relates generally to quality checking methods for threaded fasteners. It is adapted especially for use in high production manufacturing operations. Typical applications where quality checks are necessary are in the manufacture of connecting rod bolts for internal combustion engine piston rods and other assemblies where the threaded fastener is highly stressed or subject to stress reversals. Unlike prior art quality checking devices for threaded fasteners, our improved method makes use of the rate of change of torque for any given incremental angle of rotation of the threaded fastener within specified torque limits.

The improved method of our invention includes establishing upper and lower slope limit specifications for the fastener torque and rotation relationship between selected torque limits. Several torque limits are specified, including a so-called threshold torque limit and one or more upper torque limits, thereby defining separate measurement zones. If the relationship between fastener torque to fastener rotation between the specified limits falls within the selected slope limits of a first zone, the quality check for a first part of the check procedure is satisfied. Similar slope limits are established for the fastener when the torque of the fastener increases further in another zone from the first upper torque limit to a first desired torque during which time the fastener becomes stressed. The fastener yields elastically during this part of the tightening operation. In some special cases yielding may be allowed up to and possibly slightly beyond the plastic yield point of the fastener material so that a controlled amount of plastic deformation may occur.

By employing the slope limit data in this fashion it is possible to detect the presence of a cross thread condition during tightening of the fastener. The torque on the fastener under that condition will increase rapidly without an accompanying increase in the fastener rotation. Our checking method would also detect the presence of extraneous metal and certain surface irregularities at the friction surface between the head of the fastener and the cooperating surface of the fastened assembly. In such instances the torque applied to the fastener tends to increase erratically thus resulting in a defective assembly.

A control logic circuit is used for receiving torque signals from a threaded fastener driver and for receiving angle increment data for the fastener. The logic circuit utilizes this information to compute a slope in the characteristic fastener performance relationship between torque and angle of rotation. Those fasteners that do not meet the predetermined slope limits and torque limits for which the logic circuit is preset then can be detected.

BRIEF DESCRIPTION OF THE FIGURES OF THE DRAWINGS

FIG. 4 is a schematic flow diagram illustrating an electronic circuit for monitoring torque signals from a driver for a threaded fastener;

FIG. 5 is a schematic flow diagram illustrating an electronic control monitoring circuit for detecting rotation of the threaded fastener and for synthesizing a slope signal in the relationship between the torque signal and the fastener rotation signal during tightening of the fastener between selected torque limits.

PARTICULAR DESCRIPTION OF THE INVENTION

Figure 1:
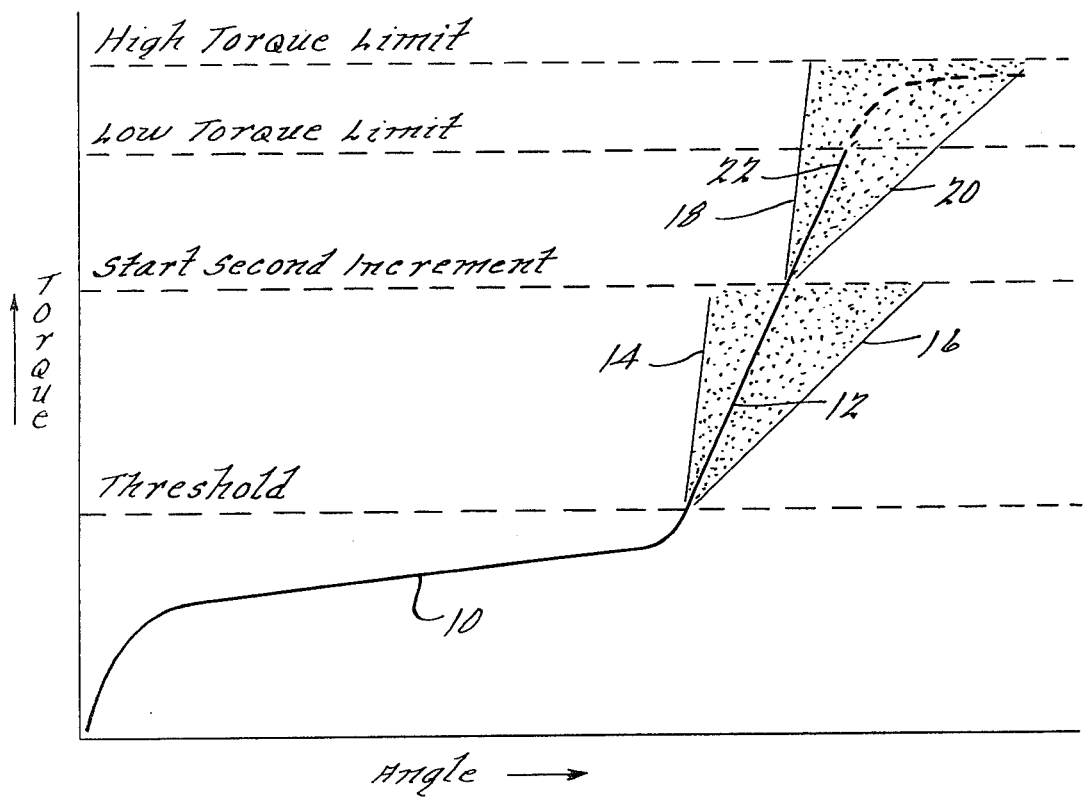
FIG. 1 shows a plot of the relationship of fastener torque to fastener angle of rotation for a typical threaded fastener, such as the connecting rod bolt for a piston of an internal combustion engine.
Figure 1:

In FIG. 1 we have shown the relationship between torque applied to a bolt and the angle of rotation of the bolt when a bolt is tightened in a bolted assembly. Examples of prior art bolted assemblies capable of using the improved method of our invention are illustrated in U.S. Pat. Nos. 2,174,356; 2,211,401; 3,472,102; 3,486,402; 3,813,933 and 3,895,517. These references show that it is known in the art to employ a nut torquing wrench in combination with transducer devices for detecting the torque applied to the bolt. The torque signal can be used to trigger interruption of the power source for a torque wrench or for producing a visual display that indicates upper or lower torque limits.

Torque limit signals are used in the improved system and operating method of our invention and these are indicated in the diagram of FIG. 1 by horizontal reference lines. The second variable that accompanies the torque variable of FIG. 1 is the angle of rotation of the fastener.

The relationship between torque and angle during initial tightening operation of the fastener is represented by a relatively flat portion 10 of the curve of FIG. 1. As the torque increases in the manner indicated in FIG. 1, each increment of torque is accompanied by a relatively large increment of fastener rotation until the threshold torque is reached. The threshold torque represents the torque limit at which the bolted parts of the assembly are engaged by the fastener and the fastener begins to yield elastically. As the tension on the fastener increases, this relationship generally is linear. This is indicated by the curve portion 12. An intermediate torque limit reference line establishes the upper level of the first torque increment and the start of a second torque increment. The slope limits within the first torque increment are designated in FIG. 1 by reference numerals 14 and 16. In the curve of FIG. 1, the curve portion 12 falls within the slope limits 14 and 16.

A second torque increment is shown in FIG. 1 between the illustrated start line for the second increment line and the previously mentioned high torque limit line. The slope limits for that increment are designated by reference characters 18 and 20. In the particular relationship shown in FIG. 1, the slope of limit line 18 equals the slope of limit line 14 and the slope of limit line 20 equals the slope of limit line 16.

The relationship between angle and torque for the fastener in the second torque increment is shown at 22. This essentially is continuation of the curve portion 12, and in most instances it is linear during tensioning of the fastener within the elastic limits of the material of which the fastener is made.

The zone for the desired ultimate torque value is defined by the high torque limit line and by the low torque limit line. During a quality check for a fastener the ultimate torque should fall within the high torque and low torque limit lines and the slope of the torque-angle relationship should fall within the slope limit lines for each torque increment. As illustrated in FIG. 1, the slope limit values may be equal for the first and second torque increments. FIG. 1 indicates also that slight plastic deformation may occur in the fastener within the second torque increment. The amount of plastic deformation that is present, if any occur, depends upon the material used. But in any case the torque on the fastener that would cause plastic deformation is substantially lower than torque that would produce rupture.

Figure 2:
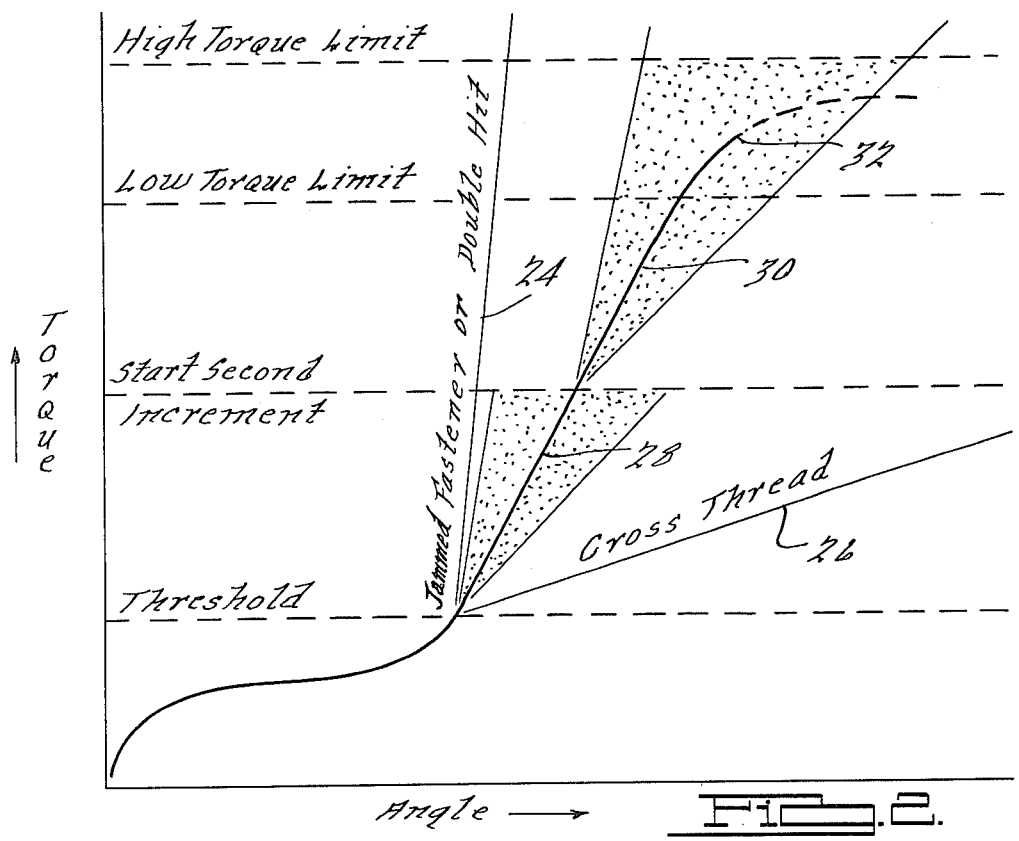
FIG. 2 is a plot similar to the plot of FIG. 1, but it shows a typical "cross-thread" condition that may occur in a bolt for an engine connecting rod, a typical "jammed fastener" condition where the thread element bottoms out in the threaded opening and a typical "double hit" condition where a fastener is retorqued. The plot is compared in FIG. 2 to a plot for a high quality threaded fastener.

In FIG. 2 we have shown for purposes of illustration a chart for a threaded fastener having typical defects. The checking procedure of our invention would reject the parts having the characteristics shown in FIG. 2. In FIG. 2 the torque-angle relationship below the threshold torque is of conventional form but upon reaching the threshold torque limit the slope of the curve shown at 24 changes to a very steep slope. The slope falls outside the slope limits specified for the first torque increment as well as the second torque increment. This condition might be obtained when the threaded fastener becomes "jammed" in the threaded opening or when the threaded fastener driver engages a fastener that already is tightened. The latter condition is referred to as a "double hit".

Shown also in FIG. 2 is a typical cross thread condition. This is illustrated in the curve portion 26 where the torque increase for any given angle change is abnormally low following a tightening operation beyond the threshold point. A torque increase is not accompanied in such cases with an increase in fastener tension.

An acceptable torque-angle relationship for the threaded fastener during the tightening operation is illustrated by the curve portions 28, 30 and 32, the curve portion 32 being located between the upper and lower torque limit. If the curve portion 32 extends outside the limits as shown by the dashed line extension, the fastener would be unacceptable because of excessive yielding.

Figure 3:
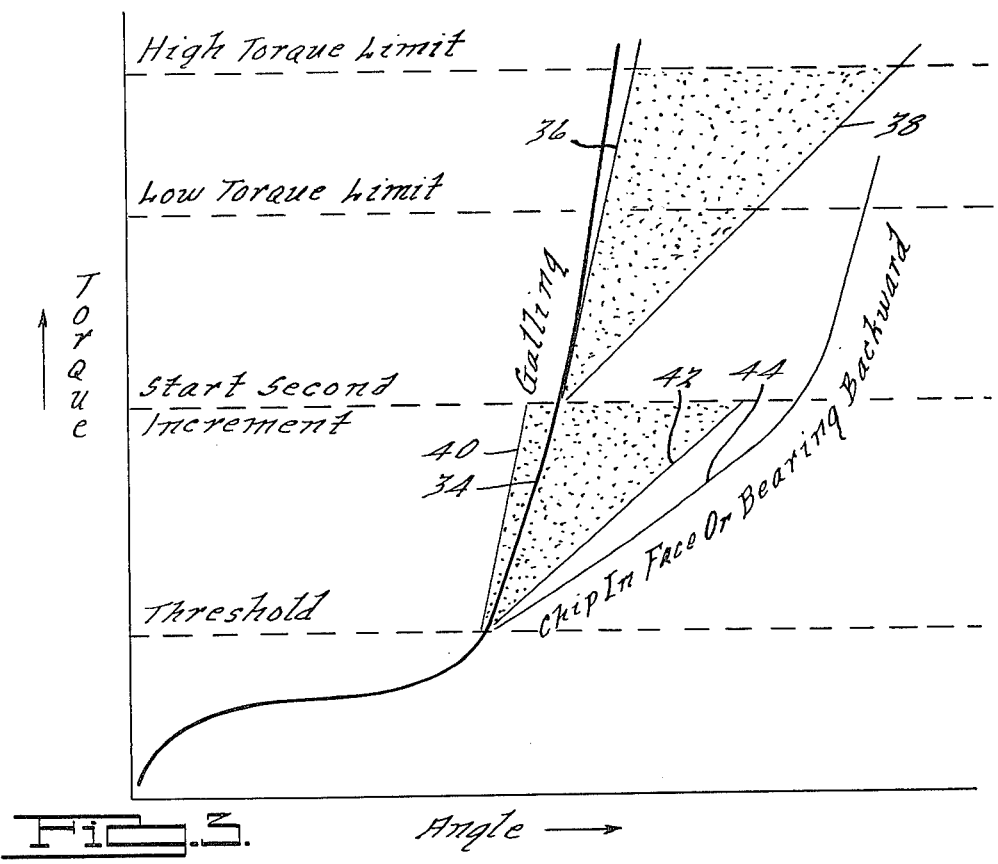
FIG. 3 is a plot similar to the plot of FIG. 1, but it shows a condition that might occur if a chip were to be present under the head of the bolt or at the face of the bearing cap for the connecting rod. It also shows conditions that might occur if the bearing for the connecting rod were to be mounted backwards during assembly or if galling were to occur.

FIG. 3 shows another defective fastener condition. The curve identified by reference numeral 34 shows the relationship between torque and angle for a threaded fastener in the first increment zone. When galling occurs with the internal threads that receive the threaded fastener, the torque increases rapidly for any given change in angle of the fastener without a corresponding increase in fastener tension. The curve 34 is shown outside the slope limits 36 and 38 in the second increment although it is within the scope limits 40 and 42 in the first torque increment.

Shown also in FIG. 3 is a condition that is typical of a threaded fastener with a metal chip between the face of the bolt and the adjacent surface of the part to be fastened. This condition is represented by curve 44. It is characterized by a relatively flat slope in the first increment corresponding to a relatively small increase in torque for a given angle change. The slope increase in the second torque increment is caused by crushing of the chip under the head of the bolt or at the face of the bearing cap. The slope increase might be due as well to linear, elastic yielding of the fastener following yielding of the bearing cap in those cases when the bearing is mounted backward. The slope of that portion of the curve may exceed the desired slope limits.

The improved method of our invention would reject the fasteners that experience any of the conditions described in FIGS. 2 and 3 regardless of whether the defect were to be detected in the first torque increment or the second torque increment, the increments being defined as mentioned earlier, by the horizontal reference lines representing the torque limits.

FIG. 4 shows a torque monitor signal flow diagram. A torque signal is received by the circuit of FIG. 4 through a control line 46 from the driving motor for the threaded fastener being checked. A torque signal can be obtained by means of known torque signal transducers, examples of which are shown in the prior art references identified in the preamble portion of this specification. The signal is amplified by an output amplifier 48. A voltage peak detector 50 located on the output side of the amplifier 48 produces an analog signal as it detects the peak voltages received from the amplifier. It dismisses extraneous voltages due to the presence of circuit irregularities and instantaneous changes in friction as the fastener is tightened. The result is an analog signal as indicated in the chart shown in FIG. 4 adjacent the peak detector. That signal in line 52 is received by the digital analog converter 56.

A fixed frequency timing pulse is received by the clock gate 58 from line 60. Line 60 may be energized by conventional clock timing circuits. A typical frequency might be 500 kilocycles per second. Counting pulses are distributed through gate 62 to a ten bit digital counter 64. The value of the count is transferred from the counter 64 through line 66 to the digital-to-analog converter 56 which develops a signal at its output side 68 that is a measure of the difference between the signal on the output side of the detector 50 and the signal in line 66. When the signals in lines 52 and 66 match, a discriminator 70 transfers the signal to the gate 62 thereby interrupting the count received by the counter 64. The value of a count is registered as torque pulses in line 72 on the input side of the counter 64.

An enabling offset torque counter signal is received by line 74 which passes through gate 76 to switch the peak detector 50 to a tracking mode. This signal also enables the 3KC clock 82 which feeds pulses to the countup and countdown gates 86 and 85. The same signal also disables gate 62. Discriminator 84 senses polarity of output signals from detector 50 on line 52 and will enable either gate 85 or gate 86 permitting clock pulses to increment or decrement counter 80 depending on polarity of the signal on line 52. The digital-to-analogue converter 78 tracks the counter 80 and sums an analogue current with offset current from line 46. Polarities are chosen to cause the output of detector 50 to null at zero volts. The output side of the counter 80 registers a count that is an indication of the offset torque value present in line 46 when the detector is nulled. That value is distributed through line 88 to comparators 90 and 92. If the offset torque is too high a suitable indicator energized by line 94 is actuated. If it is too low a suitable indicator energized by line 96 is actuated. The signals at line 88, line 96 and line 94 can be stored in latch 98.

The actual torque signal can be distributed to a local display through line 100 which is connected to the output side of the peak detector 50. If the voltage exceeds the high torque limit, the discriminator 102 is triggered thereby causing a signal to be distributed to line 104. The set point for the discriminator 102 can be fixed by energizing line 106. In a similar fashion the low torque limit value is detected by a signal in line 108 when the discriminator 110 passes a signal from the peak detector. The torque at the start of the second increment shown in FIG. 3 is indicated by the presence of a signal in line 112 which occurs when the discriminator 114 is triggered. The discriminator 116 registers a signal in line 118 when a threshold torque is exceeded.

In FIG. 5 we have shown the schematic flow diagram for detecting slope in the torque angle relationship. The torque pulses detected in line 72 of FIG. 4 are received by a logic circuit 124. Logic circuit 124 includes a so-called count-up logic portion 126 and a so-called countdown logic portion 128. Both of these logic portions will be described subsequently.

Angle pulses from a suitable angle transducer are received through line 130 by the logic circuit 124. Clock pulses from a clock and timing circuit illustrated schematically in FIG. 4 are received by the logic circuit 124 through line 132. The angle pulses are counted by an angle counter 134 having 12 binary bits when the torque value is in the first increment. When the maximum torque value established for the first increment is reached, the angle pulses begin to be distributed through gate 138 to a second angle counter 140 which also has 12 binary bits. The counter 140 establishes a binary value which is an indication of the angle pulses received by the logic circuit when the torque values are in the so-called second increment range. If the maximum count in either counter is reached, the gates 136 or 138 lock-out additional count signals. Torque pulses distributed to the logic circuit 124 cause distribution of clock countyup pulses to a first increment torque counter 142 as well as to a second increment torque counter 144. The torque reading as registered is stored in a latch circuit 46 in the case of the counter 142 or in a latch circuit 148 in the case of the counter 144. The values in these latch circuits can be distributed to the data bus 150 which can be transferred to a suitable display device for indicating applicable torque values.

The angle value that exists in the counters 134 and 140 are selected and distributed to a selector switch 152 and a selector switch 154, respectively. These values can be distributed to a binary counter 156 at the proper instant determined by the logic circuit. Clock pulses in the logic system trigger a countdown cycle for the binary counters 142 or 144 and for the preset counter 156. If the value for the first increment angle is stored in the counter 156, the counter 156 and the counter 142 begin simultaneously a countdown cycle. During the countdown cycle the counter 156 will reach a zero condition before the counter 142 reaches its zero condition. At that time a zero detector 158 on the output side of the counter 156 distributes a zero detect signal to the countdown logic thereby reseting the initial value in the counter 156 and the countdown cycle then is repeated. The number of times the countdown cycle is repeated in the counter 156 is recorded by a cycle counter 160. Finally the counter 156 interrupts the countdown cycle. At that time the cycle counter 160 will have recorded the number of repetitions in the countdown for the counter 156. This in effect is the quotient that is obtained when the torque value is divided by the angle value for the first increment torque range. The same procedure is followed for the second increment torque range.

The value in the cycle counter 160, which in effect is a slope value in the torque angle relationship of FIG. 3, is transferred to comparators 162 and 164. These comparators are preset with a low rate set point and a high rate set point respectively. If the value of the counter is below the low rate set point a signal is distributed to line 166. If the counter value is higher than the high rate set point compared to 164, a signal is distributed to line 168. These values are distributed through either a first increment low rate gate 170 or a first increment high rate gate 172. Corresponding gates 174 and 176 are provided for the counter values that are obtained during a countdown cycle in the second increment torque range. These values then are stored in storage latches 178 and 180. The stored value in latch 178, which is a measure of the slope reading in the first increment torque range, is observable by connecting a suitable display device to the output circuit shown in part at 182. A corresponding output circuit 184 is used for observing the slope value stored in the latch 180 for the second increment torque range.

Having described a preferred embodiment of our invention, what we claim and desire to secure by U.S. Letters Pat. is:

1. A method for quality checking threaded fastener assemblies comprising the steps of establishing a minimum torque threshold level, high and low final applied torque limits and an intermediate torque limit, monitoring the absolute torque value during torquing of the fastener in the torque ranges between the threshold value and the intermediate torque limit and between the intermediate torque limit and final applied torque, simultaneously checking the threaded fastener rotation in each of the aforesaid torque ranges by measuring the slope of the torque angle relationship during tightening of the fastener and for detecting variations in the slope angle to values either above or below specified slope limits within each torque range, the measurement of torque on the fastener being determined by storing electronic clock pulses in a digital storage counter and triggering a transfer of clock pulses to the counter in response to torque signals received from a torque transducer, transferring the torque signal counter value to a logic circuit, transferring fastener angle pulses from a pulse transducer to the logic circuit whereby the logic circuit responds by distributing electronic clock pulses to an angle storage counter, dividing the stored value for the torque pulses by the stored value of the angle pulses to establish a slope relationship between torque applied to the fastener and the angle of fastener rotation for a corresponding torque and detecting the variations in the magnitude of that quotient from preselected values above and below established limits whereby both slope value of the torque angle relationship and the torque value itself may be detected.

2. A method for quality checking threaded fastener assemblies comprising the steps of establishing a minimum torque threshold level, high and low final applied torque limits and an intermediate torque limit, monitoring the absolute torque value during torquing of the fastener in the torque ranges between the threshold value and the intermediate torque limit and between the intermediate torque limit and the final applied torque, simultaneously checking the threaded fastener rotation in each of the aforesaid torque ranges by measuring the slope of the torque angle relationship during tightening of the fastener and for detecting variations of the slope angle to values either above or below specified slope limits within each torque range, specifying slope limits within each torque range, specifying an upper slope limit and a lower slope limit for each torque range and specifying the upper torque limits and lower torque limits above and below the desired final applied torque point for the material of which the fastener is made, detecting a variation of the torque applied to the threaded fastener in the higher torque range either above or below specified upper and lower torque limits, the measurement of the torque on the fastener being determined by storing electronic clock pulses in a digital storage counter and triggering a transfer of clock pulses to the counter in response to torque signals received from a torque transducer, transferring the torque signal counter value to a logic circuit, transferring fastener angle pulses from a pulse transducer to the logic circuit whereby the logic circuit responds by distributing electronic clock pulses to an angle storage counter, dividing the stored value for the torque pulses by the stored angle pulses to establish the slope relationship between torque applied to the fastener and the angle of fastener rotation for a corresponding torque and detecting variations in the magnitude of that quotient from preselected values above and below established limits whereby both slope value of the torque angle relationship and the torque value itself may be detected.

3. A method for quality checking threaded fastener assemblies during a torquing cycle comprising the steps of establishing a minimum torque threshold level, high and low final applied torque limits and an intermediate torque limit, monitoring electronically the absolute incremental torque value during torquing of the fastener in the torque ranges between the threshold value and the intermediate torque limit and final applied torque, simultaneously checking the incremental threaded fastener rotation in each of the aforesaid torque ranges by measuring the slope of the torque angle relationship during tightening of the fastener and for detecting variations in the slope angle to values either above or below specified slope limits within each torque range, the monitoring of the torque value and the checking of the fastener rotation including means for accumulating electrical voltage values to form a digital signal and storing the measured digital values for incremental torque and angle for use in computing torque rates for each torque range at the end of the torquing cycle, the measurement of the torque on the fastener being determined by storing electronic clock pulses in a digital storage counter and triggering a transfer of clock pulses to the counter in response to torque signals received from a torque transducer, transferring the torque signal counter value to a logic circuit, transferring fastener angle pulses from a pulse transducer to the logic circuit whereby the logic circuit responds by distributing electronic clock pulses to an angle storage counter, dividing the stored value for the torque pulses by the stored angle pulses to establish a slope relationship between torque applied to the fastener and the angle of fastener rotation for a corresponding torque and detecting the variations in the magnitude of that quotient from preselected values above and below established limits whereby both sloped value of the torque angle relationship and the torque value itself may be detected.

* * * * *